(12) United States Patent
Wang

(10) Patent No.: US 10,005,316 B2
(45) Date of Patent: Jun. 26, 2018

(54) WHEEL DISK STRUCTURE

(71) Applicant: Superior Crown Material Co., Ltd., Tainan (TW)

(72) Inventor: Ming-Fang Wang, Tainan (TW)

(73) Assignee: Superior Crown Material Co., Ltd., Tainan (TW)

( * ) Notice: Subject to any disclaimer, the term of this patent is extended or adjusted under 35 U.S.C. 154(b) by 0 days. days.

(21) Appl. No.: 15/291,112

(22) Filed: Oct. 12, 2016

(65) Prior Publication Data

US 2018/0099524 A1   Apr. 12, 2018

(51) Int. Cl.
*B60B 7/10* (2006.01)
*B60B 7/06* (2006.01)
*B60B 7/02* (2006.01)

(52) U.S. Cl.
CPC ............... *B60B 7/10* (2013.01); *B60B 7/02* (2013.01); *B60B 7/065* (2013.01)

(58) Field of Classification Search
CPC .............. B60B 7/10; B60B 7/02; B60B 7/065
USPC ......... 301/37.28, 37.29, 37.31, 37.34, 37.41, 301/37.42, 6.3
See application file for complete search history.

(56) References Cited

U.S. PATENT DOCUMENTS

| | | | | |
|---|---|---|---|---|
| 7,147,289 B2 * | 12/2006 | Nakamura | ................ | B60B 7/08 301/37.28 |
| 7,510,248 B2 * | 3/2009 | Wang | ........................ | B60B 7/10 301/37.102 |
| 8,814,277 B2 * | 8/2014 | Ichinose | ................... | B60B 7/02 301/37.34 |
| 2007/0029866 A1 * | 2/2007 | Lin | ........................... | B60B 7/12 301/37.32 |
| 2007/0096543 A1 * | 5/2007 | Hsieh | ........................ | B60B 7/08 301/37.28 |
| 2013/0241268 A1 * | 9/2013 | Wang | ........................ | B60B 7/10 301/37.102 |
| 2015/0069823 A1 * | 3/2015 | Hsieh | ........................ | B60B 7/10 301/37.102 |

* cited by examiner

*Primary Examiner* — S. Joseph Morano
*Assistant Examiner* — Jean Charleston
(74) *Attorney, Agent, or Firm* — Alan D. Kamrath; Kamrath IP Lawfirm, P.A.

(57) ABSTRACT

A wheel disk structure includes a wheel cover and a fastening unit. The wheel cover has a side provided with a plurality of projecting members each having a periphery provided with at least two connecting seats. The fastening unit includes a plurality of locking members detachably mounted on the connecting seats of the projecting members, and a plurality of elastic members mounted between the projecting members and the locking members. Each of the locking members has a first side provided with a locking recess corresponding to each of the projecting members and mounted on each of the elastic members. Each of the locking members has a second side provided with a protrusion. Thus, the fastening unit is detachable and can be removed and replaced when being worn out, so that the wheel cover can be reused.

5 Claims, 4 Drawing Sheets

WHEEL DISK STRUCTURE

BACKGROUND OF THE INVENTION

1. Field of the Invention

The present invention relates to a wheel disk and, more particularly, to a wheel disk structure for a car.

2. Description of the Related Art

A conventional wheel disk comprises a wheel cover and a plurality of locking members integrally formed on the wheel cover. When the wheel cover is mounted on a wheel frame, the locking members are inserted into and locked in an inner hole of the wheel frame, so as to attach the wheel cover to the wheel frame. However, the locking members are easily broken or worn out during the assembling and disassembling procedures of the wheel cover, so that the wheel cover fails and cannot be reused, thereby increasing the cost of maintenance.

BRIEF SUMMARY OF THE INVENTION

In accordance with the present invention, there is provided a wheel disk structure comprising a wheel cover and a fastening unit mounted on the wheel cover. The wheel cover has an annular main body. The main body of the wheel cover has a side provided with a plurality of projecting members. Each of the projecting members of the wheel cover has a periphery provided with at least two connecting seats. The fastening unit includes a plurality of locking members detachably mounted on the at least two connecting seats of the projecting members, and a plurality of elastic members mounted between the projecting members and the locking members. Each of the locking members has a first side provided with a locking recess corresponding to each of the projecting members and mounted on each of the elastic members. Each of the locking members has a second side provided with a protrusion. Each of the elastic members is made of a metallic bar and is retained in the locking recess of each of the locking members.

Preferably, each of the at least two connecting seats has a hollow interior, and each of the locking members has a bottom inserted into each of the at least two connecting seats.

Preferably, each of the at least two connecting seats is provided with a retaining hole, and each of the locking members is provided with a retaining block inserted into the retaining hole of each of the at least two connecting seats.

According to the primary advantage of the present invention, the fastening unit is detachable and can be removed and replaced when being worn out, so that the wheel cover can be reused.

According to another advantage of the present invention, the user only needs to dismantle and change the locking members that are deformed or worn out during a long-term utilization, without having to replace the fastening unit and the wheel cover, thereby greatly saving the cost of maintenance.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
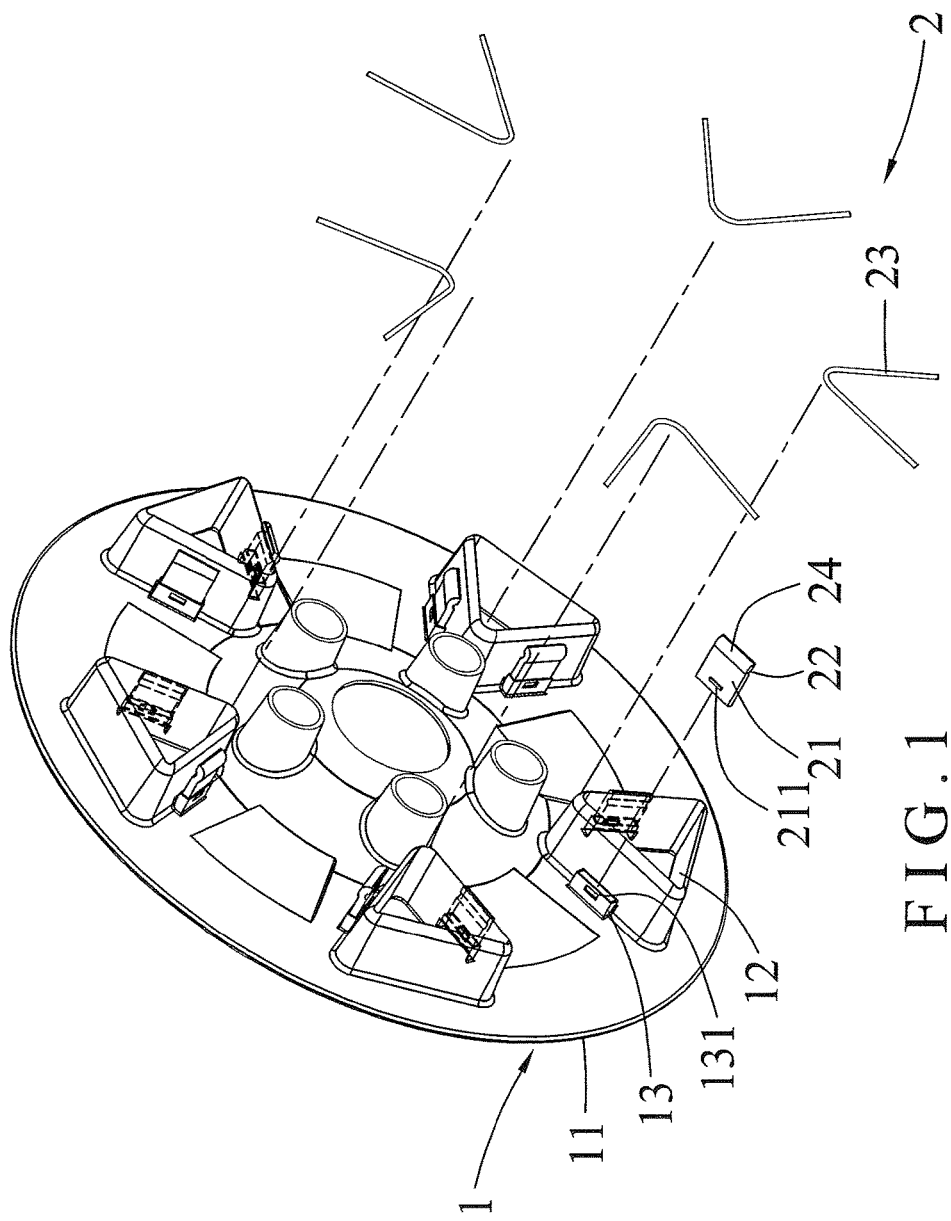
FIG. 1 is an exploded perspective view of a wheel disk structure in accordance with the preferred embodiment of the present invention.
Figure 2:
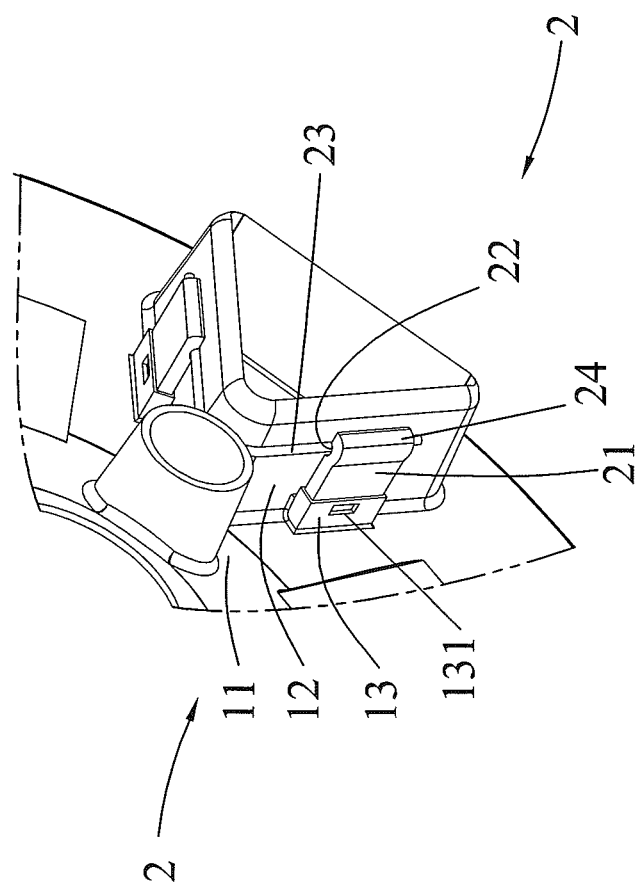
FIG. 2 is a partially perspective assembly view of the wheel disk structure in accordance with the preferred embodiment of the present invention.

Referring to the drawings and initially to FIGS. 1 and 2, a wheel disk structure in accordance with the preferred embodiment of the present invention comprises a wheel cover 1 and a fastening unit 2 mounted on the wheel cover 1.

The wheel cover 1 has an annular main body 11. The main body 11 of the wheel cover 1 has a side provided with a plurality of projecting members 12 which are arranged in an annular manner and are distant equally from each other. Each of the projecting members 12 of the wheel cover 1 has a periphery provided with at least two connecting seats 13.

The fastening unit 2 includes a plurality of locking members 21 detachably mounted on the at least two connecting seats 13 of the projecting members 12, and a plurality of elastic members 23 mounted between the projecting members 12 and the locking members 21. Each of the locking members 21 has a first side provided with a locking recess 22 corresponding to each of the projecting members 12 and mounted on each of the elastic members 23. Each of the locking members 21 has a second side provided with a protrusion 24. Each of the elastic members 23 is made of a metallic bar and is retained in the locking recess 22 of each of the locking members 21.

In the preferred embodiment of the present invention, each of the at least two connecting seats 13 has a hollow interior, and each of the locking members 21 has a bottom inserted into each of the at least two connecting seats 13. Each of the at least two connecting seats 13 is provided with a retaining hole 131, and each of the locking members 21 is provided with a retaining block 211 inserted into the retaining hole 131 of each of the at least two connecting seats 13, so that each of the locking members 21 is combined with each of the at least two connecting seats 13.

Figure 3:
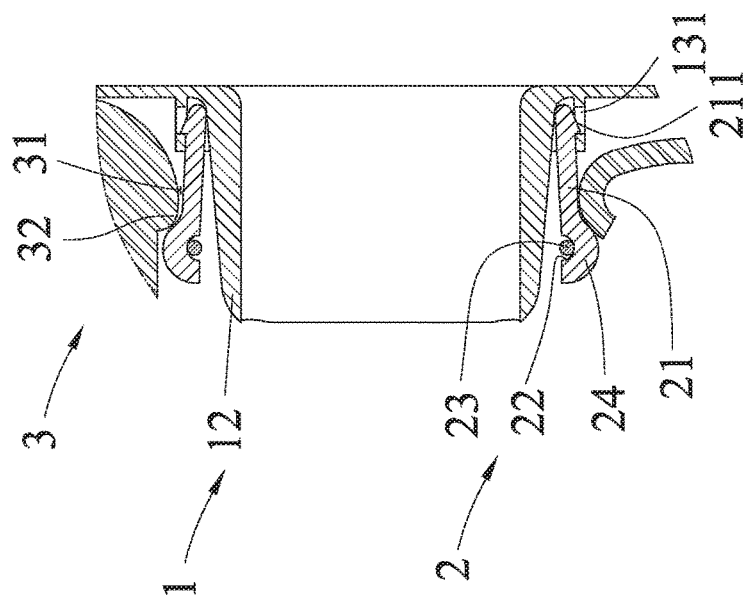
FIG. 3 is a locally cross-sectional operational view showing the wheel disk structure being pushed toward a wheel frame.
Figure 4:
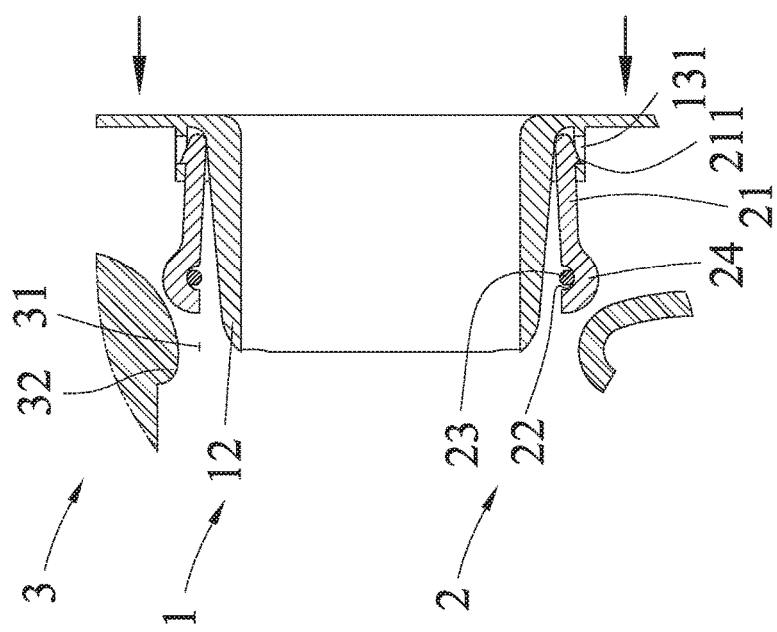
FIG. 4 is a locally cross-sectional assembly view showing the wheel disk structure being mounted on the wheel frame.
Figure 5:
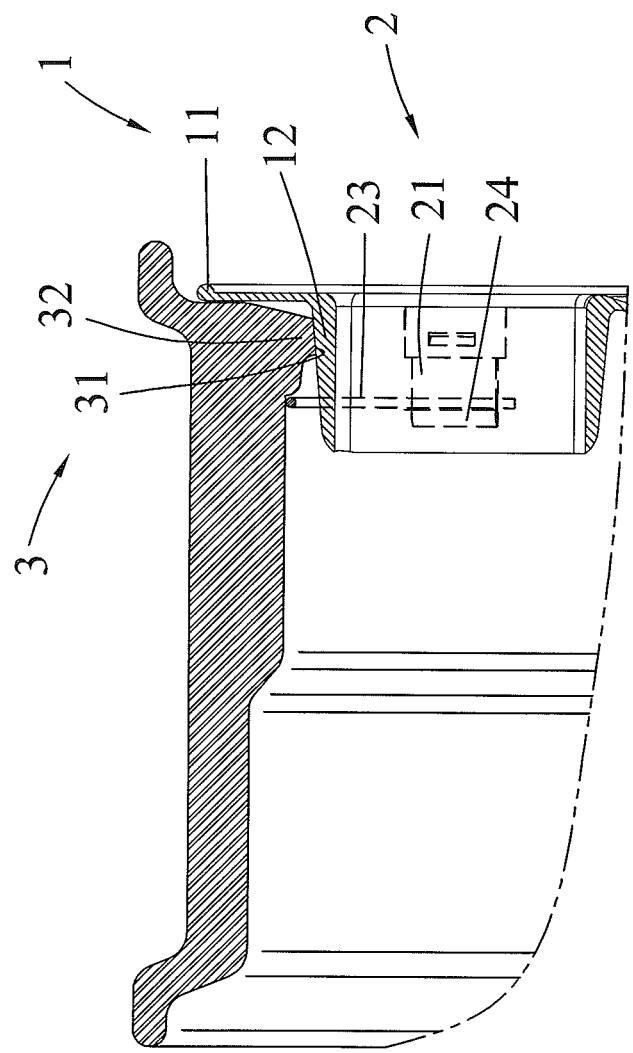
FIG. 5 is another locally cross-sectional assembly view showing the wheel disk structure being mounted on the wheel frame.

In assembly, referring to FIGS. 3-5 with reference to FIGS. 1 and 2, when the wheel cover 1 is mounted on an inner hole 31 of a wheel frame 3 as shown in FIG. 3, the protrusion 24 of each of the locking members 21 is pressed inward by a peripheral wall of the inner hole 31 of the wheel frame 3, and the elastic members 23 are biased by the locking members 21 to store a restoring force. After the protrusion 24 of each of the locking members 21 passes through the inner hole 31 of the wheel frame 3, the locking members 21 are pushed outward by the restoring force of the elastic members 23, so that the protrusion 24 of each of the locking members 21 is pushed outward to press an inner edge 32 of the inner hole 31 of the wheel frame 3 as shown in FIG. 4. Thus, the locking members 21 are locked onto the inner edge 32 of the inner hole 31 of the wheel frame 3, so that the fastening unit 2 is locked onto the wheel frame 3, and the wheel cover 1 is located outside of the wheel frame 3 as shown in FIG. 5. Thus, the wheel cover 1 is combined with the wheel frame 3.

It is appreciated that, the locking members 21 are detachably mounted on the at least two connecting seats 13 of the projecting members 12, so that the locking members 21 can be mounted on or detached from the at least two connecting seats 13 of the projecting members 12. Thus, when the locking members 21 are deformed or worn out during a long-term utilization, the locking members 21 can be detached from the at least two connecting seats 13 of the projecting members 12 for replacement.

In practice, the wheel frame 3 produces a high temperature in operation, and the high temperature is directly transmitted to the wheel cover 1. At this time, the locking members 21 largely contact with the wheel frame 3 so that the locking members 21 are deformed by the high temperature. Thus, the user only needs to dismantle and change the locking members 21 that are deformed or worn out, without having to replace the wheel cover 1, thereby saving the cost of maintenance.

Again referring to FIGS. 1 and 2, each of the projecting members 12 of the wheel cover 1 is designed to have a rectangular shape, and the at least two connecting seats 13 are located at any two sides of each of the projecting members 12. Thus, each of the elastic members 23 has a substantially V-shaped profile and has two ends each retained in the locking recess 22 of each of the locking members 21.

In another preferred embodiment of the present invention, the elastic members 23 and the locking members 21 are selectively mounted on the at least two connecting seats 13 of the projecting members 12. For example, if the wheel cover 1 has six projecting members 12, the elastic members 23 and the locking members 21 are in turn mounted on three of the six projecting members 12, so that the projecting members 12 can be used repeatedly.

Accordingly, the fastening unit 2 is detachable and can be removed and replaced when being worn out, so that the wheel cover 1 can be reused. In addition, the user only needs to dismantle and change the locking members 21 that are deformed or worn out during a long-term utilization, without having to replace the fastening unit 2 and the wheel cover 1, thereby greatly saving the cost of maintenance.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A wheel disk structure comprising:
a wheel cover; and
a fastening unit mounted on the wheel cover;
wherein:
the wheel cover has an annular main body;
the main body of the wheel cover has a side provided with a plurality of projecting members;
each of the projecting members of the wheel cover has a periphery provided with at least two connecting seats;
the fastening unit includes a plurality of locking members detachably mounted on the at least two connecting seats of the projecting members, and a plurality of elastic members mounted between the projecting members and the locking members;
each of the locking members has a first side provided with a locking recess facing each of the projecting members and mounted on each of the elastic members;
each of the locking members has a second side provided with a protrusion;
each of the elastic members is located on the at least two connecting seats of one of the projecting members; and
each of the elastic members is retained in the locking recess of each of the locking members.

2. The wheel disk structure of claim 1, wherein each of the at least two connecting seats has a hollow interior, and each of the locking members has a bottom inserted into each of the at least two connecting seats.

3. The wheel disk structure of claim 1, wherein each of the locking members has a first end pivotally mounted on each of the projecting members and a second end provided with the locking recess and pressed by each of the elastic members, with each of the locking members being forced outward by each of the elastic members and being pivoted outward relative to each of the projecting members.

4. The wheel disk structure of claim 1, wherein the locking recess of each of the locking members has an arcuate shape.

5. The wheel disk structure of claim 1, wherein the protrusion of each of the locking members has an arcuate shape.

* * * * *